(12) United States Patent
Beckmann et al.

(10) Patent No.: US 8,113,103 B2
(45) Date of Patent: Feb. 14, 2012

(54) TRIGGER APPARATUS FOR USE WITH FIREARMS

(75) Inventors: Rudi Beckmann, Rotenberg (DE); Wilhelm Fischbach, Deisslingen (DE); Johannes Aberl, Sulz (DE)

(73) Assignee: Heckler and Koch GmbH, Oberndorf/Neckar (DE)

( * ) Notice: Subject to any disclaimer, the term of this patent is extended or adjusted under 35 U.S.C. 154(b) by 123 days.

(21) Appl. No.: 12/604,041

(22) Filed: Oct. 22, 2009

(65) Prior Publication Data

US 2010/0107464 A1    May 6, 2010

Related U.S. Application Data

(63) Continuation of application No. PCT/EP2008/003281, filed on Apr. 23, 2008.

(30) Foreign Application Priority Data

Apr. 24, 2007 (DE) ...................... 10 2007 019 310.8

(51) Int. Cl.
*F41A 19/00* (2006.01)
(52) U.S. Cl. .............. 89/27.3; 89/28.1; 89/132; 89/135; 89/136
(58) Field of Classification Search ................... 89/27.3, 89/28.05, 28.1, 132, 135, 136; 42/69.01
See application file for complete search history.

(56) References Cited

U.S. PATENT DOCUMENTS

| | | | |
|---|---|---|---|
| 2,397,507 A | 4/1946 | Roberts, Jr. | |
| 2,413,241 A | 12/1946 | Mejean et al. | |
| 2,457,827 A | 1/1949 | Love | |
| 2,576,953 A | 12/1951 | Lucht | |
| 3,971,291 A | 7/1976 | Schellenberg | |
| 4,196,653 A * | 4/1980 | Jackson | 89/136 |
| 4,457,209 A * | 7/1984 | Scheurich et al. | 89/45 |

(Continued)

FOREIGN PATENT DOCUMENTS

WO    2004010070    1/2004

OTHER PUBLICATIONS

International Bureau, "International Preliminary Report on Patentability," issued in connection with international application serial No. PCT/EP2008/003281, mailed Dec. 3, 2009, 6 pages.

International Searching Authority, "International Search Report," issued in connection with International application No. PCT/EP2008/003281, mailed Sep. 24, 2008, 6 pages.

(Continued)

*Primary Examiner* — Michael David
(74) *Attorney, Agent, or Firm* — Hanley, Flight & Zimmerman, LLC (57) ABSTRACT

Trigger apparatus for use with firearms are described herein. An example electronic trigger apparatus described herein includes a first actuation drive to move an actuation member between an initial position and an operating position at which the actuating member is to activate a trigger lever of the firearm to discharge the firearm. A clutch is movable between a first position to operatively couple the first actuation drive to the actuation member and a second position to releasably couple the first actuation drive from the actuation member. A second actuation drive is operatively coupled to the actuation member and biases the actuation member to the initial position when the first actuation drive is releasably coupled from the actuating member via the clutch.

24 Claims, 5 Drawing Sheets

U.S. PATENT DOCUMENTS

| | | | | |
|---|---|---|---|---|
| 4,494,440 A | * | 1/1985 | Koine | 89/33.04 |
| 4,532,852 A | * | 8/1985 | Hance et al. | 89/136 |
| 4,674,392 A | * | 6/1987 | Beckmann | 89/33.04 |
| 4,681,018 A | * | 7/1987 | Beckmann | 89/33.04 |
| 4,765,223 A | * | 8/1988 | Beckmann | 89/33.04 |
| 4,784,036 A | * | 11/1988 | Brichta | 89/136 |
| 5,111,732 A | * | 5/1992 | Marcon et al. | 89/135 |
| 7,103,999 B2 | * | 9/2006 | Jones | 42/69.01 |
| 7,469,623 B1 | * | 12/2008 | Olcott | 89/27.3 |

OTHER PUBLICATIONS

International Searching Authority, "Written Opinion of the International Searching Authority," issued in connection with PCT/EP2008/003281, mailed Sep. 24, 2008, 6 pages.

"Amended Pages," for International application serial No. PCT/EP2008/003281, 17 pages, mailed Feb. 18, 2009.

\* cited by examiner

TRIGGER APPARATUS FOR USE WITH FIREARMS

CROSS-REFERENCE TO RELATED APPLICATIONS

This patent is a continuation of International Patent Application Serial No. PCT/EP2008/003281, filed Apr. 23, 2008, which claims priority to German Patent Application 10 2007 019 310.8, filed on Apr. 24, 2007, both of which are hereby incorporated herein by reference in their entireties.

FIELD OF THE DISCLOSURE

The present disclosure relates generally to trigger apparatus and, more particularly, to trigger apparatus for use with firearms.

BACKGROUND

Firearms or weapons employ a trigger apparatus or device that is to be actuated (e.g., via a user, an actuation device, etc.) to discharge the firearm. In some instances, an actuation device or mechanism may be used to actuate or move a trigger lever along a trigger path to discharge the firearm. Such actuation mechanisms are often used, for example, to actuate the trigger lever of a firearm from a location remote from the firearm. For instance, actuation mechanism may be employed to autonomously discharge firearms firmly mounted to, for example, a carriage or frame, an airplane, a military ship, a building, a gunner's cockpit, etc. In this manner, the user may be located in a safer environment while defending from attack an area in which the firearm is present. The actuation device can be controlled electronically, hydraulically, pneumatically, or any other suitable mechanism(s).

Additionally, actuation mechanisms may be directly or indirectly coupled to the trigger lever to discharge the firearm. When an actuation mechanism is directly coupled to the trigger lever, the actuation mechanism must move the trigger lever along a trigger path between an initial position and a discharge position. However, some known example actuation mechanisms configured to actuate trigger lever having relatively long trigger paths often compromise desired actuation action for discharging the firearm. For example, a user may desire to rapidly cease fire of the firearm. In yet another example, when using high cadence weapons (e.g., machine guns, aircraft cannons, grenade launchers), a user of such firearms may desire to emit or fire short bursts of fire in a controlled manner.

Thus, an actuation device or mechanism may be configured to partially move the trigger lever through a portion of the trigger path. In such a configuration, the actuation device is typically bridged (supplemented) with another moving mechanism (e.g., a gear transmission) to move the trigger level through the remaining portion of the trigger path. In this manner, the actuation mechanism can provide a desired actuation action for discharging the firearm.

Additionally or alternatively, if a bridging device is employed, the energy required to actuate or operate the actuation mechanism should be as minimal as possible to preserve limited energy resources. For example, an actuation mechanism that employs a solenoid drive that is bridged by means of an electromagnetically actuating element may draw a relatively larger electric current. Alternatively, an actuation mechanism bridged with a gear transmission may draw a relatively higher voltage consumption due to the higher actuating forces associated with the gear transmission. Additionally, actuation mechanisms employed with a gear drive or transmission may reduced the overall operational speed of the actuation mechanism, which may be detrimental when a user desires to rapidly interrupt or stop the firing action of the firearm.

In yet another example, an actuation mechanism employs a continuously rotating drive device that is coupled to a swivel lever drive via a clutch or interrupter mechanism. The drive completes a 360 degree rotation to move the swivel arm between a back and forth movement or cycle. The swivel arm, in turn, is operatively coupled to the trigger lever via a connecting rod. However, once the actuation mechanism commences movement through its cycle, a user cannot interrupt or cease the actuation mechanism until the firearm is discharged (i.e., until the cycle is complete). Such example actuation mechanism is described in U.S. Pat. Nos. 2,576,953 and 2,457,827.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity. Additionally, several examples have been described throughout this specification. Any features from any example may be included with, a replacement for, or otherwise combined with other features from other examples. Further, throughout this description, position designations such as "above," "below," "top," "forward," "rear," "left," "right," etc. are referenced to a firearm held in a normal firing position (i.e., wherein the "shooting direction" is pointed away from the marksman in a generally horizontal direction) and from the point of view of the marksman. Furthermore, the normal firing position of the firearm is always assumed, i.e., the position in which the barrel runs along a horizontal axis.

A firearm or weapon typically employs a trigger apparatus or mechanism to fire or discharge the firearm. In general, to discharge a firearm, a user applies a force to move a trigger lever (e.g., using his index finger) along a trigger path between an initial position and a discharge position. Alternatively, a trigger apparatus may include an actuation device to discharge the firearm, for example, autonomously via a remote control.

An example trigger apparatus described herein includes a first actuation drive to discharge a firearm. The first actuation drive is operatively coupled to an actuation element or swivel arm via a clutch assembly. The clutch assembly moves between a first position to operatively couple the first actuation drive to the swivel arm and a second position to releasably couple the first actuation drive from the swivel arm. When the clutch is in the first position, the first actuation drive causes the swivel arm to engage or activate a trigger lever to discharge the firearm. The first actuation drive can also be configured to maintain or hold the swivel arm operatively engaged with the trigger lever for rapid or continuous fire action. When the clutch is in the second position, the first actuation drive is decoupled from the swivel arm. The swivel arm is reset or moved to its initial position via a reset mechanism of the trigger lever. In some examples, a second actuation drive may be employed to move or help return the swivel arm to its initial position away from trigger lever. Thus, the first actuation drive does not require or does not have to be reset to an initial position in order to reset or move the swivel arm to the initial position. The first actuation drive may be dedicated for only discharging the firearm, i.e., to move the swivel lever toward the trigger lever.

In yet another example, another actuation drive may be employed to activate or move a selector lever of a safety switch between a safety-on position and a safety-off position. Likewise, the second actuation can move the selector lever to an initial position (e.g., either the safety-on or the safety-off position) without having to reset or move the actuation drive to an initial position. Thus, the actuation drive may be dedicated to only move the safety or selector lever to a position (e.g., a safety-off position) in which the firearm can be discharged. Also, the second actuation drive may be employed to operate a firing mode selector switch (e.g., single mode, burst mode, continuous mode, etc.).

Figure 1:
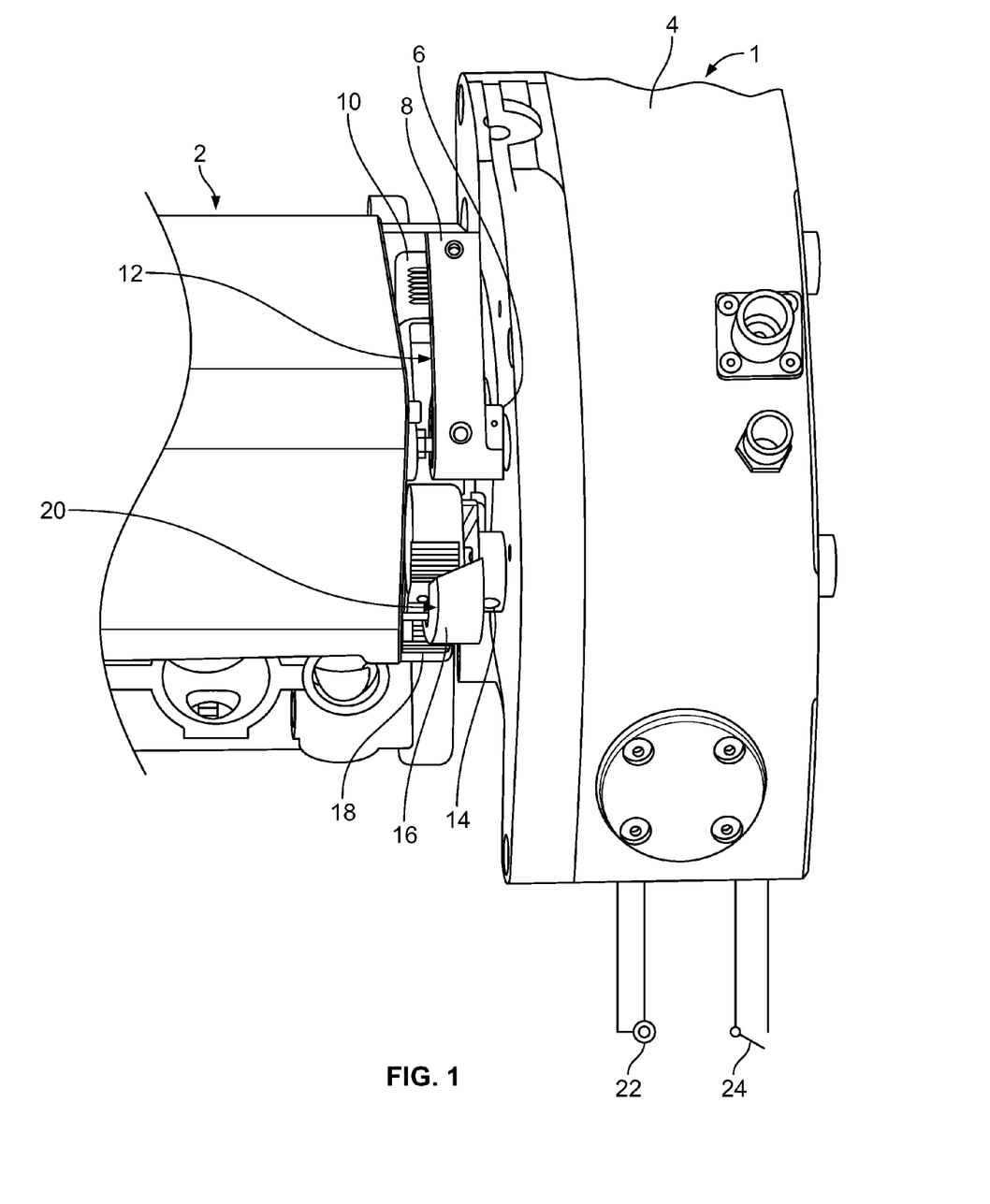
FIG. 1 illustrates a partial view of an example trigger apparatus described herein.

FIG. 1 illustrates a partial view of an example trigger apparatus or assembly 1 disposed or arranged adjacent an operating region 2 of a firearm. The trigger apparatus 1 includes a housing 4 that couples to the operating region 2 of the firearm and houses an actuation device or assembly 12. In this example, the operating region 2 includes a trigger lever 10 that travels between a trigger path to discharge the firearm.

In the illustrates example, the actuation device 12 includes a drive shaft 6 that protrudes from the housing 4 and an actuation member or a swivel lever or arm 8 that pivots relative to the housing 4 about an axis of the drive shaft 6. A first end of the swivel arm 8 is fixedly mounted or coupled to the drive shaft 6 such that a second end of the swivel arm 8 pivots between an initial position (e.g., the position in FIG. 2) and an operating position (e.g., toward the trigger lever 10) when the drive shaft 6 is rotated. The second end of the swivel arm 8 is adjacent a trigger lever 10 of the firearm and actuates the trigger lever 10 when the swivel arm 8 is pivoted to the operating position via the drive shaft 6. The drive shaft 6 and the swivel arm 8 are substantially disposed within the housing 4 of the trigger apparatus 1. The swivel arm 8 drives or moves substantially along a sector or arcuate path and can be coupled to the drive shaft 6 via, for example, bearing arrangements. Such a configuration is relatively less expensive than an actuation system having, for example, a linear drive.

If a firearm includes a safety/selector lever 18, another actuation device or assembly 20 (similar to the actuation device 12) may also be employed to activate the safety/selector lever 18. In this example, the actuation device 20 is also substantially disposed within the housing 4 of the trigger apparatus 1. As shown, the actuation device 20 includes a drive shaft 14 that protrudes from the housing 4 of the trigger apparatus 1 and a swivel lever or arm 16 that pivots (e.g., in a sector or arcuate path) relative to the housing 4. A first end of the swivel lever 16 is fixedly mounted or coupled to the drive shaft 14 and a second end of the swivel lever 16 is adjacent the safety/selector lever 18 of the firearm. The safety/selector lever 18 can be positioned between a first position to prevent discharge of the firearm and a second position to enable discharge of the firearm. Additionally or alternatively, in other examples, the safety/selector lever 18 may also enable a user to select a mode of operation or discharge (e.g., semi-automatic fire, automatic fire, rapid burst fire, etc.). The second end of the swivel lever 16 actuates the safety/selector lever 18 when the swivel lever 16 is pivoted toward the safety/selector lever 18 via the drive shaft 14.

As shown, the actuation devices 12, 20 are actuated by respective, schematically represented switches 22, 24. In other words, the switch 22 is to be activated to discharge the firearm and the switch 24 is to be activated to move a safety lever to a safety-off position. In one example, the switch 22 may include a pushbutton to activate the actuation device 12 and the switch 24 may include a lever to activate the actuation device 20. In other examples, a control system (not shown) may be employed to actuate the actuation devices 12 and/or 20. In yet another example, either of the switches 22 or 24 may be activated from a remote location relative to the firearm via a remote control.

Alternatively, in yet another example, both the actuation devices 12, 20 are actuated by a single switch. In such a configuration, when the single switch is activated, the safety/selector lever 18 is first moved to the safety-off position via the actuation device 20 and then the trigger lever 10 is moved to discharge via the actuation device 12. A controller (e.g., a microprocessor) may be employed to cause the actuation device 20 to operate prior to the actuation device 12.

Figure 2:
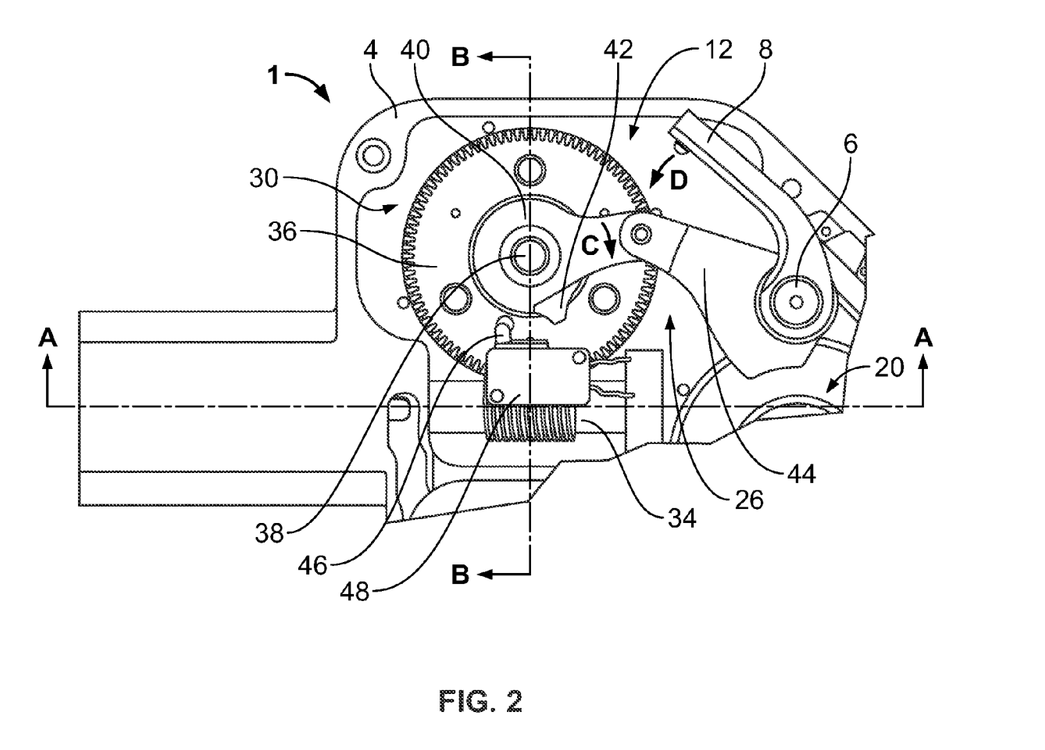
FIG. 2 illustrates a cross-sectional view of the example trigger apparatus of FIG. 1.
Figure 3:
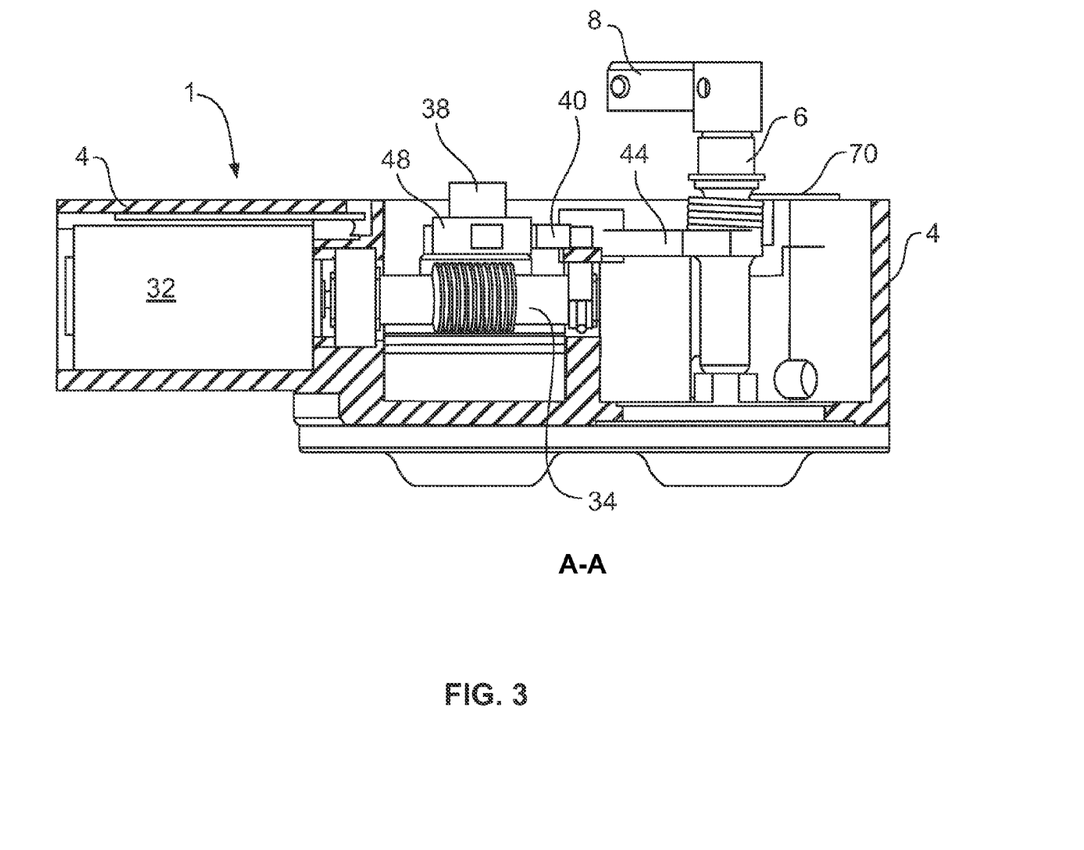
FIG. 3 illustrates a cross-sectional view of the example trigger apparatus of FIGS. 1 and 2 taken along line A-A of FIG. 2.

FIG. 2 illustrates a partial view of the actuation device 12 having a portion of the housing 4 removed. FIG. 3 illustrates a view of the actuation device 12 taken along line A-A of FIG. 2. Referring to FIGS. 2 and 3, a first actuation drive assembly or system 30 is operatively coupled to the actuation device 12 via a coupling assembly 26 (e.g., a slider-crank assembly). In this example, the first actuation drive 30 actuates or operates the actuation device 12.

The first actuation drive 30 includes a motor 32 coupled to a worm gear transmission. The worm gear transmission includes a worm gear 34 driven by the motor 32, and a gear 36 coupled to a spindle or shaft 38. The coupling assembly 26 includes a first link 40 coupled to a second link 44 at respective first ends via, for example, a fastener. A second end of the first link 40 is coupled to the shaft 38 and can pivot relative to the housing 4 about an axis of the shaft 38. A second end of the second link 44 is coupled to the drive shaft 6 and can pivot relative to the housing 4 about an axis of the drive shaft 6. A control cam 42 is coupled to (e.g., integrally formed with) the first link 40, that depending on the position of the first link 40, is to engage a contact element 46 of a toggle or limit switch 48 during operation of the first actuation drive 30.

In operation, when the gear 36 is operatively coupled to the shaft 38 as described in greater detail below, the motor 32 turns the worm gear 34 which, in turn, rotates the gear 36 in a first direction indicated by arrow C. Rotation of the gear 36 in the first direction causes the first link 40 to rotate in the first direction, which causes the second link 44 and, thus, the first drive shaft 6 to rotate in a second direction opposite the first direction. In turn, the drive shaft 6 causes the swivel arm 8 to pivot relative to the housing toward the trigger lever 10 in a direction indicated by arrow D. When the swivel arm 8 is in the operating position, the swivel arm 8 engages or contacts the trigger lever 10 (FIG. 1) to discharge the firearm.

When the swivel arm 8 engages the trigger lever 10, the control cam 42 engages the contact element 46 of the limit switch 48 to provide a signal and indicate an end of travel. In other words, the control cam 42 can be positioned to pre-set the travel distance of the first actuation drive 30. In this manner, the first actuation drive 30 can be adapted or configured to operate different firearms (e.g., having different trigger paths) and/or different features or components of the firearm. As a result, the limit switch 48 produces a signal to halt the operation of the motor 32 (e.g., prevents electric current to the motor 32).

Although the motor 32 is not in operation when the control cam 42 contacts the contact element 46, the worm gear 34 remains in engagement with the gear 36 to maintain or lock the position of the gear 36 (e.g., a self-locking gear transmission). As a result, the worm gear 34 holds or maintains the swivel arm 8 in the operating position in which the swivel arm 8 is in contact with the trigger lever 10 to discharge the firearm even if the motor 32 is turned off (i.e., an energy supply is not required). Additionally, a worm gear transmission generally provides an energy-efficient mechanism that provides high actuating forces with relatively high actuating speeds.

Figure 4:
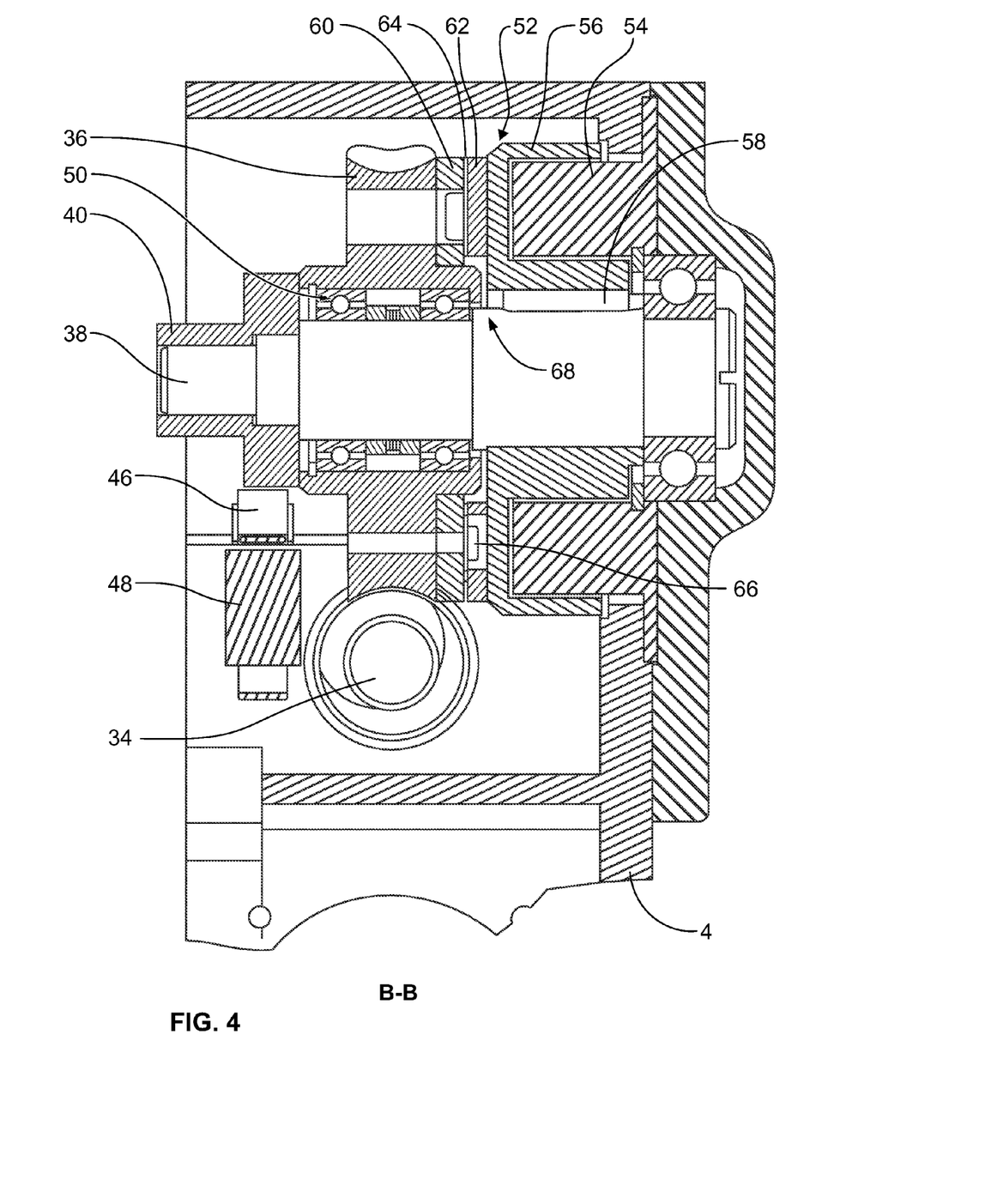
FIG. 4 illustrates another cross-sectional view of the example trigger apparatus of FIGS. 1 and 2 taken along line B-B of FIG. 2.

FIG. 4 is a cross-sectional view of the example trigger apparatus 1 taken along line B-B of FIG. 2. As noted above, the gear 36 and the first link 40 are operatively coupled via the shaft 38. A bearing 50 couples (e.g., rotatably) the gear 36 to the shaft 38. A clutch assembly 52 is employed to selectively operatively couple (and releasably couple or disengage) the gear 36 and the shaft 38. In this example, the clutch 52 is a spring-loaded electromagnetic clutch. However, in other examples, the clutch 52 may be a gear and lever configuration or any other suitable clutch assembly.

In this example, the clutch 52 includes a coil (not shown) disposed within a coil housing 54 and a drive hub 56. The coil housing 54 is fixedly coupled to the housing 4 and the drive hub 56 is fixedly coupled to the shaft 38 via, for example, a key connection such that the drive hub 56 can rotate relative to the coil housing 54. An armature disk 62 is rotatably coupled to the gear 36 via a spring washer or disk spring 64 and an adapter ring 60. The adapter ring 60, the armature disk 62 and the disk spring 64 are rotatably coupled to the gear 36 via fasteners 66 (e.g., screws). More specifically, the disk spring 64 maintains or holds a first or front surface of the armature disk 62 in an axial direction of the shaft 38 at a distance from an opposing first or front surface of the drive hub 56 to form a gap 68 between the opposing surfaces of the armature disk 62 and the drive hub 56.

As shown in FIG. 4, when the gap 68 exits between the drive hub 56 and the armature disk 62, the gear 36 is disengaged or decoupled from the shaft 38. In the decoupled position, the shaft 38 and, thus, the first link 40 can rotate freely relative to the gear 36 and the housing 4 while the gear 36 is held in position by the worm gear 34. If the worm gear 34 is driving or rotating the gear 36 when in the clutch 52 is the decoupled position, the gear 36 rotates relative to shaft 38, but does not interfere or cause the shaft 38 to rotate. In other words, when the clutch 52 is in the decoupled position, the armature disk 62 frictionally disengages the drive hub 56 and the shaft 38 rotates the first link 40 and, thus, the swivel arm 8 independent of the first actuation drive 30.

To couple the gear 36 to the shaft 38 and, thus, the first link 40, electrical current is provided to the coil in the coil housing 54. When electric current is supplied to the coil, the armature disk 62 is attracted (e.g., elastically deforms) in an axial direction of the shaft 38 toward the drive hub 56 causing the opposing surfaces of the armature disk 62 and the drive hub 56 to frictionally engage. The frictional engagement between the armature disk 62 and the drive hub 56 couples the gear 36 and the shaft 38. In the coupled position, the gear 36 drives or rotates the first link 40 via the shaft 38. In other words, in the coupled position, the gear 36 drives or rotates the first link 40.

In operation, referring to FIGS. 2-4, the first actuation drive 30 is activated via the first switch 22. The clutch 52 is positioned in the coupled position when the switch 22 is activated. In particular, electrical current is provided to the coil, which causes the armature disk 62 to frictionally engage the drive hub 56. The motor 32 is also activated via switch 22. The motor 32 rotates or drives worm gear 34, which drives or rotates the gear 36. When the clutch 52 is in the coupled position, the gear 36 drives the first link 40 in the direction indicated by arrow C via the shaft 38. The first link 40 causes the second link 44 to rotate the drive shaft 6, thereby causing the swivel arm 8 to pivot relative to the housing 4 toward the trigger lever 10. Thus, the coupling assembly 26 causes the swivel arm 8 to pivot in a direction indicated by arrow D to the operating position in which the swivel arm 8 causes the trigger lever 10 to discharge the firearm. When the swivel arm 8 is in the operating position, the control cam 42 contacts or engages the contact element 46 of the limit switch 48 to stop or halt the motor 32. Nonetheless, electrical current is still provided to the coil of the clutch 52 via the first switch 22. Thus, the gear 36 remains operatively coupled to the shaft 38 even when electric power to motor 32 is removed.

To operatively decouple or disengage the gear 36 from the shaft 38, the switch 22 is interrupted or moved to an off position (e.g., a pushbutton is released). In turn, the electrical power or current is removed from the coil of the clutch 52. As a result, the disk spring 64 moves the armature disk 62 axially away from the opposing surface of (e.g., frictionally disengages from) the drive hub 56 and causes the gear 36 to operatively decouple from the shaft 38 and the first link 40. A reset mechanism of the trigger lever 10 moves the swivel arm 8 back to its idle or initial position (FIG. 2) when the clutch 52 is in the decoupled position. In this manner, the first actuation drive 30 does not have to be reset to an initial position and can be dedicated to only discharging the firearm (e.g., moving the swivel arm 8 toward the trigger lever 10).

As described in greater detail below, in this example, the trigger apparatus 1 includes a second actuation drive 70 to help move (e.g., rapidly bias) the swivel arm 8 in a direction opposite the direction indicated by arrow D to return or reset the swivel arm 8 to the initial position (e.g., the position shown in FIG. 2) when the gear 36 disengages or decouples from the shaft 38. Thus, in this manner, the first actuation drive 30 does not have to be reset or positioned to an initial position and need only be driven in a first direction, providing a less complex control and/or assembly of the trigger apparatus 1. As a result, the example trigger apparatus 1 provides an actuation mechanism that can provide relatively rapid or instantaneous interruption of fire.

Alternatively, the second actuation drive 70 may be employed to return the swivel lever 16 of the other actuation drive 20 to an initial position (e.g., corresponding to a safety-off position) without having to reset or move the first actuation drive 30 to an initial position.

Figure 5:
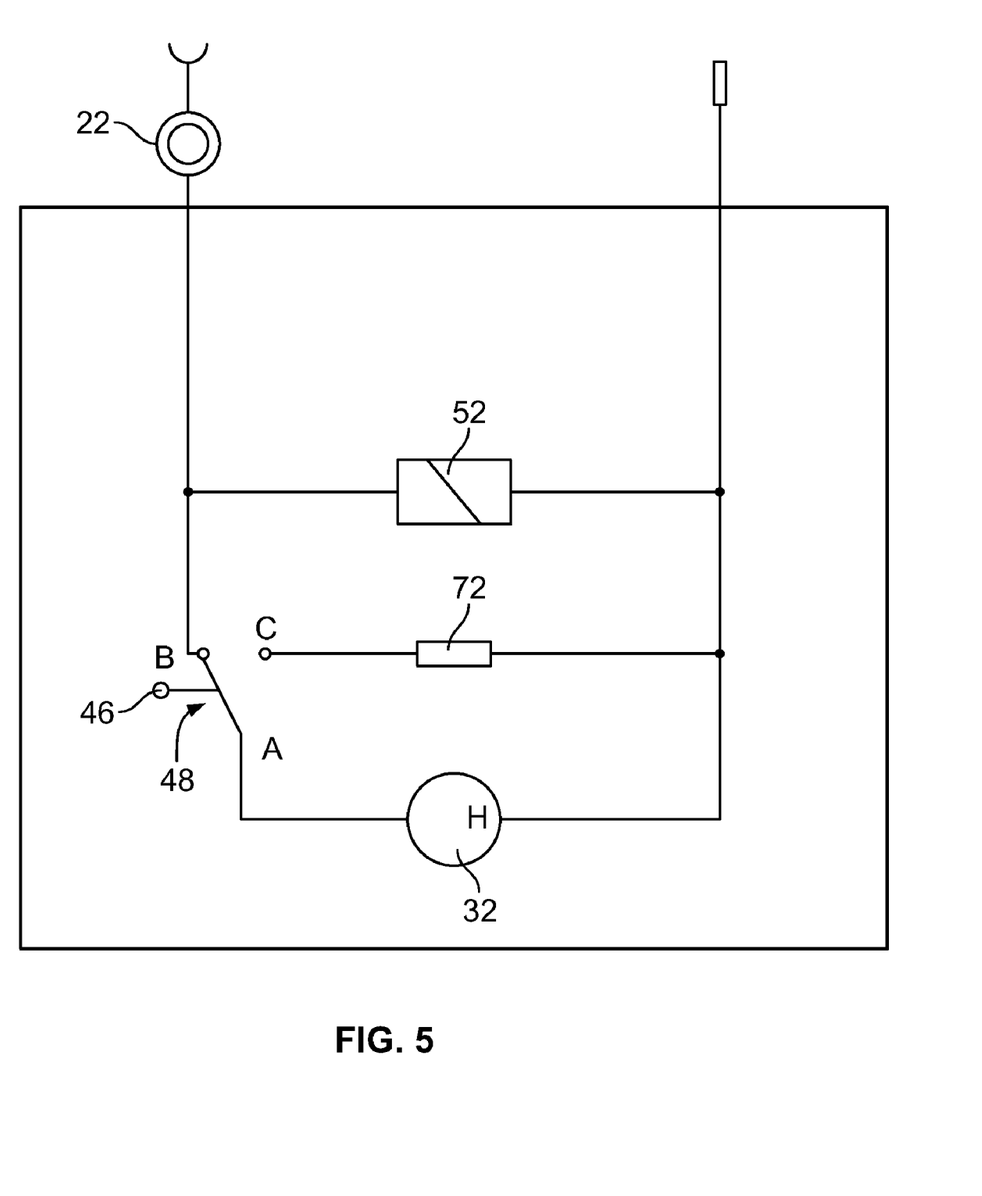
FIG. 5 illustrates an example schematic circuit diagram used to implement the trigger apparatus of FIGS. 1-4.

FIG. 5 illustrates an example schematic circuit diagram that can be used to implement the example trigger apparatus 1 of FIGS. 1-4. In this example, the clutch 52 and the motor 32 are electrically coupled in parallel. Thus, when the switch 22 is activated, electrical power is provided to both the clutch 52 and the motor 32 when a limit switch 48 is in a first position as shown in FIG. 5. When the swivel arm 8 moves to the working position described above (engages the trigger lever 10), the control cam 42 engages the contact element 46 and causes the limit switch 48 to move to a second position (e.g., the limit switch 48 engages node C of FIG. 5) in which the clutch 52 and a resistor 72 are electrically coupled in parallel. When the limit switch 48 is in the second position, power is no longer supplied or provided to the motor 32. In other words, when the limit switch 48 is in the second position, electrical current is no longer delivered to the motor 32, but current remaining in the motor 32 flows to the resistor 72 (i.e., the resistor 72 short-circuits the motor 32). As a result, the motor 32 stops or halts operation.

However, when the limit switch 48 is in the second position, electric power is still supplied or provided to the clutch 52 and, thus, the clutch 52 operatively couples the gear 36 and the shaft 38. Although the motor 32 is off, the worm gear 34 retains or locks the position of the gear 36 and, thus, the swivel arm 8 is maintained in the activation position. When the switch 22 is deactivated (e.g., a pushbutton is released), electric power no longer flows to the coil of the clutch 52 (or the motor 32), which causes the clutch 52 to operatively decouple the gear 36 from the shaft 38 and the first link 40 (i.e., the decoupled position). In the decoupled position, the gear 36 is decoupled from the shaft 38 such that the shaft 38 can rotate freely relative to the gear 36, thereby allowing the swivel arm 8 to reset and move to the initial position of FIG. 2.

As noted above, the second actuation drive 70 moves the swivel arm 8 to its initial position when the first actuation drive 30 is decoupled from the actuation device 12. In this example, the second actuation drive 70 is a biasing element disposed between the drive shaft 6 and the housing 4 (e.g., a tensile drive unit). As shown, the second actuation drive 70 is coaxially coupled to the drive shaft 6 to provide a relatively compact dimensional footprint. The second actuation drive 70 biases or shifts the swivel arm 8 toward the initial position when the clutch 52 is in the decoupled position (i.e., when the gear 36 is decoupled from the shaft 38). Additionally, as the second actuation drive 70 moves the swivel arm 8 toward the initial position of FIG. 2, the second link 44 of the coupling assembly 26 causes the first link 40 and the control cam 42 to move to an initial position or reset position (e.g., the position shown in FIG. 2). As the swivel arm 8 moves toward the initial position, the trigger lever 10 moves to an initial or a non-discharge position.

Additionally, the second actuation drive 70 does not require additional energy (e.g., a second supply source) to activate to reset the position of the swivel arm 8 to the initial position. Instead, the energy of the biasing element is stored (e.g., the biasing element is configured to be compressed or in tension) when the first actuation drive 30 moves the swivel arm 8 between the initial position and the operating position to discharge the firearm. Thus, the second actuation drive 70 or the biasing element moves to a stored energy condition when the first actuation drive 30 moves the swivel arm 8 to the operating position at which the firearm discharges.

Additionally or alternatively, a power failure, for example, will not cause the firearm to discharge and/or the firing of rounds will be instantaneously stopped or halted because electrical excitation is required to cause the clutch 52 to move or occupy its clutch position to operatively couple the gear 36 and the shaft 38. In other words, when electrical power is removed from the clutch 52 (e.g., during a power failure), the clutch 52 releases the gear 36 from the shaft 38 and the second actuation drive 70 moves the swivel arm 8 to the initial or idle position relatively rapidly or instantaneously.

Likewise, a firearm that employs the actuation device 20 to move a safety selector from a safety-on position to a safety-off position also prevents discharge of the firearm during, for example, a power failure. For example, when the actuation device 20 is configured to move the safety lever from a safety-on position, which prevents discharge of the firearm, to a safety-off position, which allows discharge of the firearm, electrical power is required to drive the actuation device 20. During a power failure, the clutch 52 releases the actuation device 20, which enables a second actuation device (e.g., the second actuation drive 70 coaxially coupled with drive shaft 14) to move the swivel lever 16 to the initial position or the safety-on position. The other actuation device 20 is configured to operate substantially similar to the actuation device 12 and, thus, for sake of brevity will not be repeated.

In another example, the swivel arm 8 may be directly coupled to the shaft 38. Additionally or alternatively, the second actuation drive 70 (e.g., a biasing element) may also be directly coupled to the shaft 38 between the housing 4 and the shaft 38.

In yet other examples, a plurality of control cams 42 and/or toggle switches 48 may be employed to detect the radial position of the coupling assembly 26 (e.g., detect various positions of the first link 40). Such a configuration is advantageous for firearms having a trigger lever that may have two or more switch or activation positions. For example, such an example trigger apparatus may be used to actuate a selector lever having multiple different activation positions. In yet other examples, electronic or electro-optical position sensors or detectors may be employed to detect or determine one or more switching positions of the trigger apparatus 1. In such a configuration, a control system may be employed to process the signals of the sensors. In other examples, any other suitable sensor may be employed to determine the position of the first link 40, the shaft 38, the motor 32, the worm gear 34, the gear 36, the swivel arm 8, etc.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A trigger apparatus configured for use with a firearm, comprising:
    a first actuation drive to move an actuation member between an initial position and an operating position at which the actuation member is to activate a trigger lever of the firearm to discharge the firearm;
    a clutch movable between a first position to operatively couple the first actuation drive to the actuation member and a second position to decouple the first actuation drive from the actuation member; and
    a second actuation drive operatively coupled to the actuation member to bias the actuation member to the initial position when the first actuation drive is decoupled from the actuation member via the clutch.

2. A trigger apparatus as described in claim 1, wherein the first actuation drive and the second actuation drive comprise swivel drives.

3. A trigger apparatus as described in claim 1, wherein the first actuation drive comprises a motor and a worm gear transmission assembly and the second actuation drive comprises a spring drive assembly.

4. A trigger apparatus as described in claim 1, wherein the first actuation drive, the second actuation drive and the clutch are configured such that a biasing element of the second actuation drive moves to a stored energy condition when the first actuation drive moves the actuation member to the operating position at which the firearm discharges.

5. A trigger apparatus as described in claim 1, wherein the clutch comprises a spring loaded, electromagnetic clutch that moves to the first position to operatively couple the first actuation drive to the actuation member when electrical power is provided to a coil of the clutch.

6. A trigger apparatus as described in claim 1, wherein the first actuation drive is disposed on a first shaft and the actuation member is disposed on a second shaft parallel to and adjacent the first shaft.

7. A trigger apparatus as described in claim 6, wherein a slider crank assembly operatively couples the first actuation drive and the actuation member.

8. A trigger apparatus as described in claim 1, wherein the first actuation drive further comprises a control cam to determine the desired travel distance of the actuating member.

9. A trigger apparatus as described in claim 8, wherein the control cam is to engage a contact element to activate a toggle switch when the actuation member is in the discharge position.

10. A trigger apparatus as described in claim 1, wherein the second actuation drive is coaxially aligned with the actuation member.

11. A trigger apparatus as described in claim 1, wherein the actuation member moves a trigger lever of the firearm to the discharge position to discharge the firearm.

12. A trigger apparatus as described in claim 1, wherein the first actuation drive may be actuated or activated from a remote location.

13. A trigger apparatus as described in claim 1, further comprising a third actuation drive operatively coupled to a safety lever or a selector lever of the firearm via a second actuation member, wherein the third actuation drive actuates the second actuation member to move the safety lever or selector lever between a first or locked position and a second or unlocked position.

14. A trigger apparatus as described in claim 13, further comprising a switch to activate both the first and third actuation drives.

15. A trigger apparatus as described in claim 13, further comprising a first switch to activate the first actuation drive and a second switch to activate the third actuation drive.

16. A trigger apparatus of claim 1, wherein the first actuation drive is operatively coupled to a first swivel arm, wherein the first actuation drive is to move the first swivel arm between a first position at which the first swivel arm is away from the trigger lever of the firearm and a second position at which the swivel arm engages the trigger lever to discharge the firearm.

17. A trigger apparatus as described in claim 16, wherein the first actuation drive comprises a motor to rotate a worm gear coupled to a drive gear.

18. A trigger apparatus as described in claim 16, wherein the clutch is to operatively couple the first actuation drive and the first swivel arm when the clutch is in the first position and to decouple the first actuation drive and the first swivel arm when the clutch is in the second position, wherein when the clutch is in the first position, the first actuation drive is to drive the first swivel arm toward the trigger lever to discharge the firearm, and wherein when the clutch is in the second position, the swivel arm can rotate independent of the first actuation drive to the first position.

19. A trigger apparatus as described in claim 18, wherein the second actuation drive is to move the first swivel arm to the first position when the clutch is in the second position, and wherein the swivel arm is to rotate independent of the first actuation drive.

20. A trigger apparatus as described in claim 18, wherein the clutch comprises a coil disposed within a coil housing and a drive hub, wherein an armature disk coupled to the first actuation drive frictionally engages the drive hub when electrical power is supplied to the coil to operatively couple the first actuation drive and the swivel arm.

21. A trigger apparatus as described in claim 1, wherein the first actuation drive is operatively coupled to a swivel arm when the first actuation drive is activated via a switch, wherein the first actuation drive is to move the swivel arm toward the trigger lever to discharge the firearm.

22. A trigger apparatus as described in claim 21, wherein the first actuation drive is operatively coupled to the swivel arm via the clutch when the switch is activated, wherein the clutch comprises an electromagnetic clutch.

23. A trigger apparatus as described in claim 22, wherein the first actuation drive is operatively coupled to the swivel arm when electric current is provided to the clutch via the switch, and wherein first actuation drive is operatively decoupled from the swivel arm when electric current is removed from the clutch via the switch.

24. A trigger apparatus as described in claim 21, wherein the second actuation drive is operatively coupled to the swivel arm to move the swivel arm to an initial position away from the trigger lever when first actuation drive is not activated.

* * * * *